(12) United States Patent
Lu et al.

(10) Patent No.: US 6,600,568 B1
(45) Date of Patent: Jul. 29, 2003

(54) SYSTEM AND METHOD OF MEASURING IMAGE SENSOR CHIP SHIFT

(75) Inventors: Yu-Yang Lu, Taipei (TW); Nai-Yueh Liang, Taipei (TW)

(73) Assignee: Benq Corporation, Taoyuan (TW)

(*) Notice: Subject to any disclaimer, the term of this patent is extended or adjusted under 35 U.S.C. 154(b) by 0 days.

(21) Appl. No.: 09/433,465

(22) Filed: Nov. 4, 1999

(30) Foreign Application Priority Data

Nov. 6, 1998 (TW) .......................... 87118535 A (51) Int. Cl.[7] .............................. G01B 11/14
(52) U.S. Cl. ........................ 356/614; 356/615
(58) Field of Search .................. 356/614, 615–624, 356/626, 630

(56) References Cited

U.S. PATENT DOCUMENTS 5,724,094 A   3/1998  Tseng et al. ............... 348/243
5,999,265 A * 12/1999  Dalancon et al. ........... 356/614

* cited by examiner

*Primary Examiner*—Michael P. Stafira
*Assistant Examiner*—Amanda Merlino
(74) *Attorney, Agent, or Firm*—Ladas & Parry (57) ABSTRACT

A method of measuring sensor chip shift comprises the following steps. First, provide a contact image sensor module comprising a plurality of sensor chips arranged in a row on a main board, with each sensor chip having multiple sensors. Next, provide a test chart with a predetermined pattern. Further, enable the multiple sensors of the contact image sensor module to scan the predetermined pattern of the test chart. Moreover, select signal waves sensed by the sensors at the ends of two adjacent sensor chips. Finally, calculate the gap between the sensors at the ends of the two adjacent sensor chips according to the signal waves.

22 Claims, 6 Drawing Sheets

SYSTEM AND METHOD OF MEASURING IMAGE SENSOR CHIP SHIFT

BACKGROUND OF THE INVENTION

1. Field of the Invention

This invention relates to a measurement system, particularly to a system for measuring contact image sensor chip shift.

2. Description of the Invention

In a typical image scanning device, such as an image scanner, the following three components are frequently used to capture the image of a subject document: a light source for illuminating a document, an image sensor, and an optical system for focusing document images onto an image sensor. A conventional image sensor array is formed with a charge-coupled device (CCD).

However, in an image scanner scanning an A4 (210 mm wide) document, the lenses system needs to- reduce the A4 document to the extent the CCD is capable of receiving. Consequently, the required optical distance of the lenses system is approximately 300 mm. Hence, the image scanner is bulky. Further, the quality tends to be affected by temperature change and mechanical stress if reflective lenses are used to downsize the device.

Therefore, a contact image sensor (CIS) has been used to replace the aforementioned image sensor of the CCD device (The structure and function of this contact image sensor is described in U.S. Pat. No. 5,724,094). Since the width of the contact image sensor is arranged to be the same as that of an A4 document, image data can be acquired with optical lenses of the same power to plot the document onto the contact image, sensor. As a result, the construction is simplified, and the size of the scanning device is greatly reduced.

Figure 1:
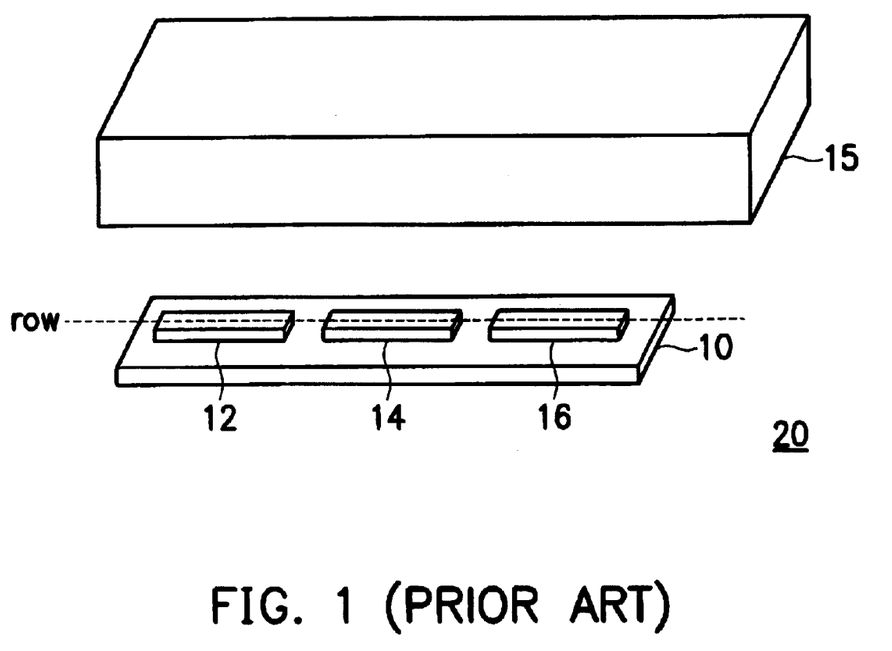
FIG. 1 is a diagram illustrating a contact image sensor module.

As shown in FIG. 1, in the contact image sensor module 20, image sensor chips 12, 14, 16 are generally arranged in a row on the main board 10. During assembly, the image sensor chips 12, 14, and 16 are measured manually with a microscope to spot any shift, and further fixed and sealed onto a frame 15.

However, when these contact image sensor modules 20 are applied to a scanner, any misalignment of the image sensor chips 12, 14, and 16 sealed with the main board onto the frame 1o results n a discontinuity in the scanned image. The only solution after assembly of the scanner is to dismount the frame 15 to inspect the image sensor chips with a microscope. However, the contact image sensor modules can be damaged and become unusable during this destructive ingression.

SUMMARY OF THE INVENTION

Accordingly, an object of this invention is to solve the aforementioned problems by providing a system of measuring image sensor chip shift, wherein the gap or pitch of various image sensor chips can be measured with image processing. Thus, even when contact image sensor modules are sealed and fixed, the shift amount of the gaps between various image sensor chips can still be precisely measured without damaging them.

To achieve the above object, this invention provides a method of measuring sensor chip shift comprising the following steps. First, provide a contact image sensor module comprising a plurality of sensor chips arranged in a row on a main board, with each sensor chip having multiple sensors. Next, provide a test chart with a predetermined pattern. Further, enable the multiple sensors of the contact image sensor module to scan the predetermined pattern of the test chart. Moreover, select signal waves sensed by the sensors at the ends of two adjacent sensor chips. Finally, calculate the gap between the sensors at the ends of the two adjacent sensor chips according to the signal waves.

The predetermined pattern of the test chart comprises spaced black and white lines, wherein the spaced black and white lines can be horizontal lines or diagonal lines, and the width of the black and white lines can be the same or different.

When black lines are scanned, their corresponding signal waves indicate a low-luminance area. When these white lines are scanned, their corresponding signal waves indicate a high-luminance area; and when an area composed partially of black lines and white lines are scanned, the luminance of their corresponding signal waves is between that of the high-luminance area and the low-luminance area.

Another method of calculating the gap between the ends of two adjacent sensor chips is to shift horizontally the signal waves corresponding to the sensors between two ends of the adjacent sensor chips until they overlap, and calculate the shifting distance so the horizontal or the vertical gap of the sensors between ends of two adjacent sensor chips can be obtained.

The following describes an embodiment of this invention.

DETAILED DESCRIPTION OF THE EMBODIMENT

Figure 2A:
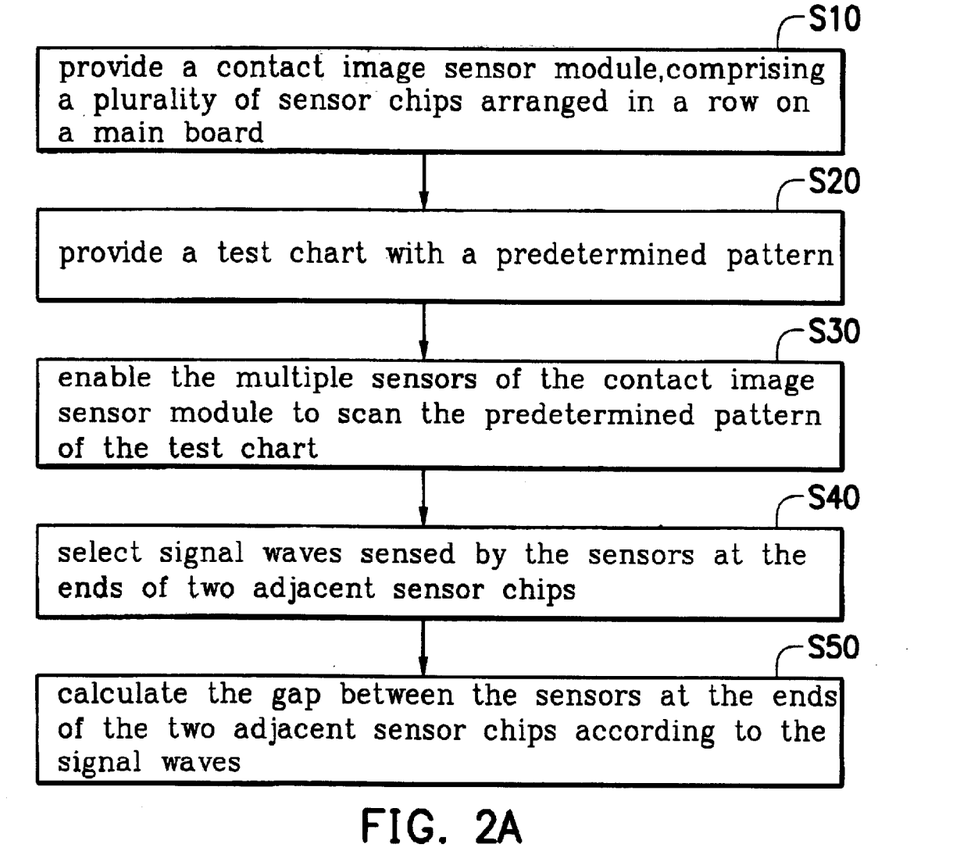
FIG. 2A is a flowchart illustrating a method of measuring image sensor chip shift of this invention.

Refer to FIG. 2A. A method of measuring sensor chip shift of this invention comprises the following steps:

First, in Step S10, provide a contact image sensor module comprising a plurality of sensor chips arranged in a row on a main board, with each sensor chip having multiple sensors.

Next, in Step 20, provide a test chart with a predetermined pattern.

Further, in Step 30, enable the multiple sensors of the contact image sensor module to scan the predetermined pattern of the test chart.

Moreover, in Step 40, select signal waves sensed by the sensors located at the ends of two adjacent sensor chips.

Finally, in Step 50, calculate the gap between the sensors located at the ends of the two adjacent sensor chips according to the signal waves.

Figure 2B:
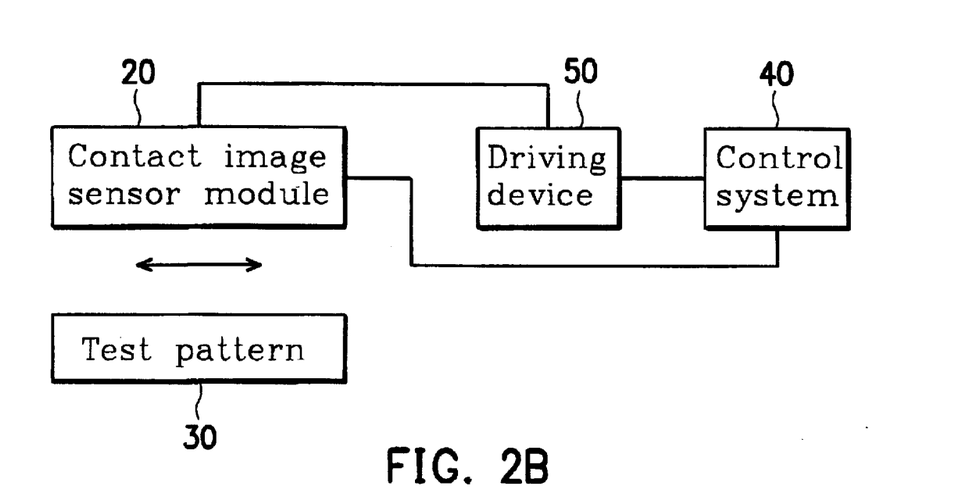
FIG. 2B is a block diagram illustrating a system of measuring image sensor chip shift in accordance with the preferred embodiment of FIG. 2A.
Figure 6:
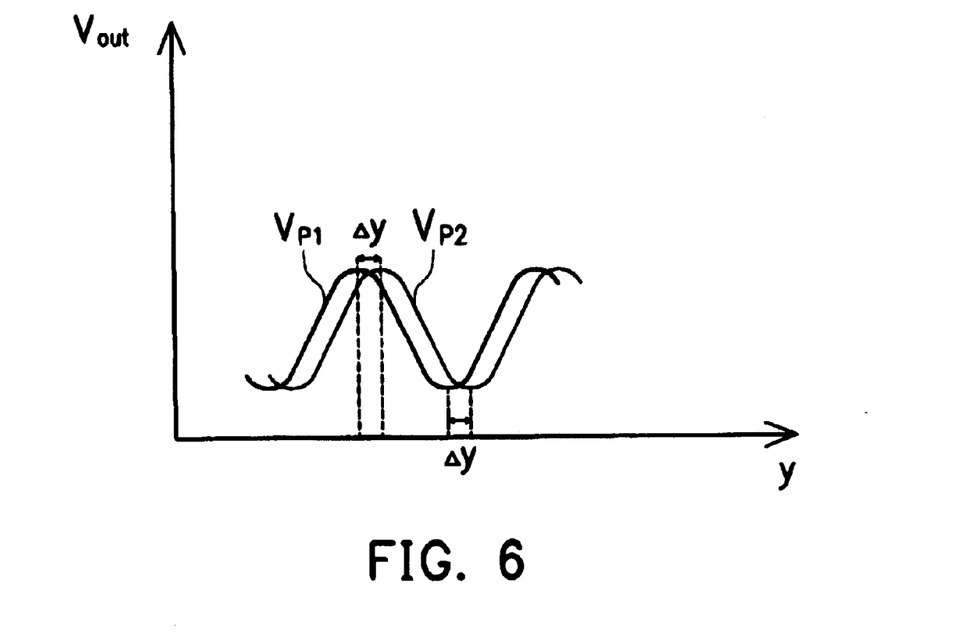

Refer to FIG. 2B, a diagram illustrating a system of measuring image sensor chip shift in accordance with a preferred embodiment of this invention. The system comprises a test chart 30 with a predetermined pattern, such as the black lines 32, 34, and 36 in FIG. 3 and the white lines 38 and 38b between them. A contact image sensor module 20 basically comprises multiple sensor chips arranged in a row, such as 12, 14 and 16 of FIG. 1, each sensor chip, equipped with multiple sensors, includes sensors at ends of two adjacent sensor chips, such as P1 and P2 of FIG. 4. A control system 40, such as a computer having a central processor unit (not shown), is used to enable a driving device 50 and the contact image sensor module 20. So, the driving device 50, such as.a step motor, is enabled to drive the contact image.sensor module 20 to move across the test chart 30 for scanning the predetermined pattern along a direction y perpendicular to the row. Then, the control system 40 obtains signal waves measured by the sensors P1 and P2 located at the ends of two adjacent sensor chips, as shown in FIG. 6. According to a shift distance Δy between the signal waves, the control system 40 calculates the gap between the sensors at ends of the two adjacent sensor chips, such as the gap Δy at the vertical direction y. Therein, the calculation of the gap is based on the central points of the sensors.

In the embodiment of FIG. 2B, the contact image sensor module 20's driven by the driving device 50 to move across the test chart 30 for scanning the predetermined pattern. However, it should be noted, the spirit of this invention includes any relative movement between a contact image sensor module and a test chart. For example, the driving device 50 can be enabled to drive the test chart 30 to move across the contact image sensor module 20. Then, the contact image sensor module 20 is able to scan the predetermined pattern.

Figure 3:
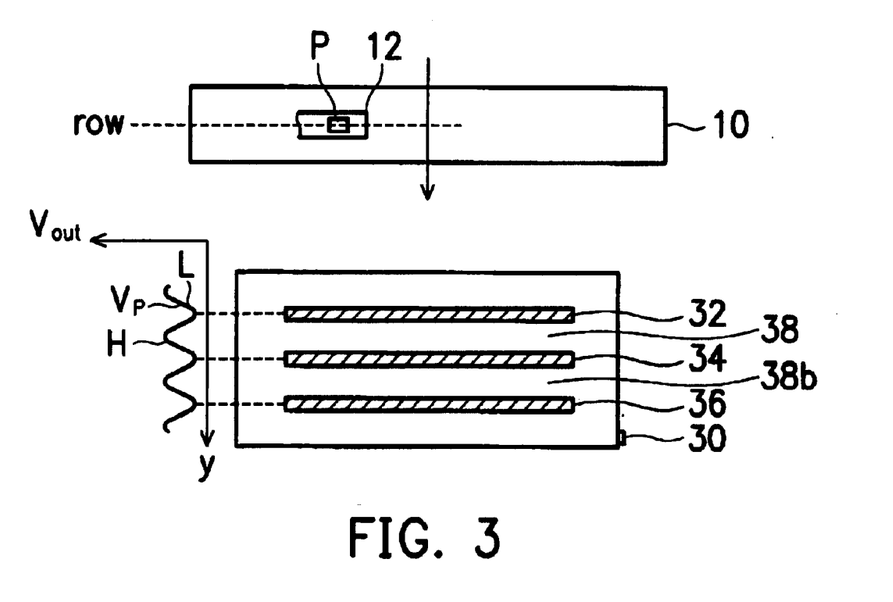
FIG. 3 illustrates signal waves with luminance variations sensed and obtained by the sensor at the ends of a single sensor chip when a scan is performed in a direction vertical to the test chart in an embodiment of this invention.

Refer to FIG. 3, a diagram illustrating an example of the contact image sensor module 20 scanning the test chart 30 along a direction y perpendicular to the row, whereby the sensor P at one end of the sensor chip 12 senses the test chart 30 having the predetermined pattern. In this embodiment, the predetermined pattern comprises horizontal black lines 32, 34, and 36 and the white lines 38 and 38b between them. The black lines 32, 34, and 36 and the white lines 38 and 38b are arranged in a direction parallel to the row. Then, the signal wave Vp is obtained by the control system 40, wherein the abscissa represents the distance in the y direction and the ordinate represents luminance variations Vout.

Furthermore, the horizontal black lines 32, 34, and 36 and the white lines 38 and 38b of the test chart 30 can be formed with light or laser composite interference lines. The width of the black and white lines can be the same or different. When the black lines such as 32, 34, and 36 are scanned, their corresponding signal waves indicate a low-luminance area L. When the white lines, such as 38, are scanned, their corresponding signal waves indicate a high-luminance area H. When the area covering a part of the black lines, such as 32 and 34, and a part of the white lines, such as 38, is scanned, the luminance of their corresponding signal waves falls in the middle of that of the high-luminance area H and the low-luminance area L.

Figure 4:
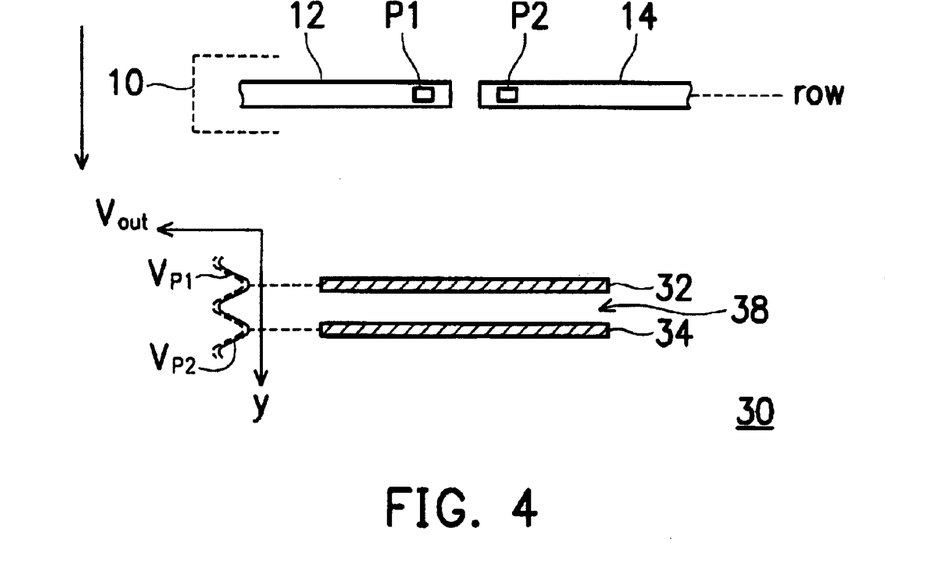
FIG. 4 is a diagram illustrating signal waves with luminance variations sensed and obtained by not shifting the sensors located at the ends of two adjacent sensor chips when a scan is performed in a direction vertical to he test chart when there is substantially no shift between the two adjacent sensor chips according to one embodiment of this invention.

Refer to FIG. 4. In terms of the two adjacent sensor chips 12 and 14 on the main board 10, if there is substantially no shift distance at the ends of the two adjacent sensor chips P1 and P2 in the vertical direction y, then the signal waves Vp1 and Vp2 of the sensors P1 and P2 at the ends of the two adjacent sensor chips 12 and 14 almost overlap with each other upon scanning, because P1 and P2 simultaneously pass the black lines 32 and 34 and the white line 38 between them.

Figure 5:
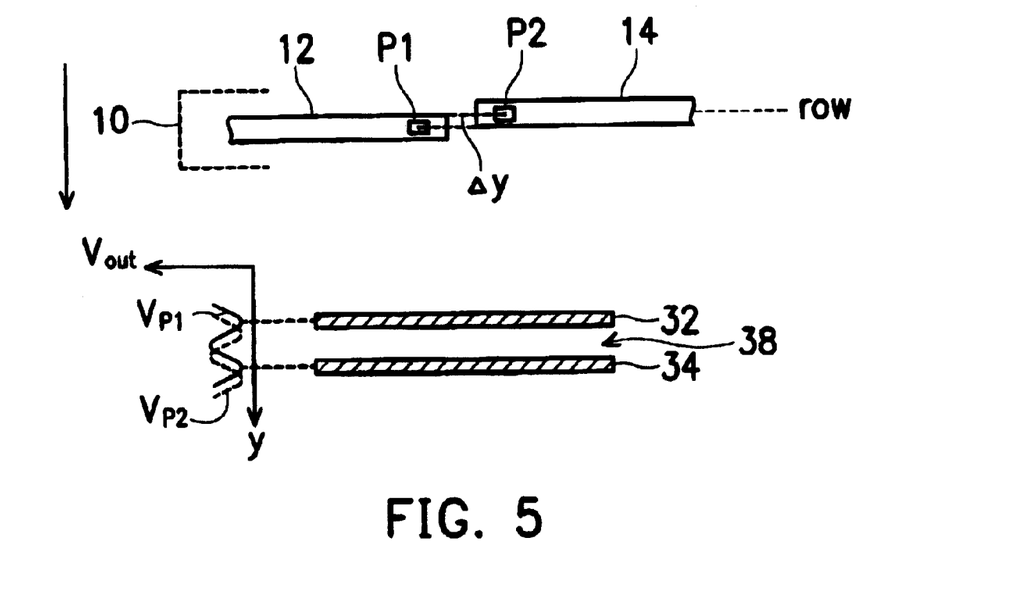
FIGS. 5 and 6 are diagrams illustrating an embodiment of this invention, wherein scanning is performed in a direction perpendicular to the test chart to obtain signal waves formed by luminance variations and sensed by shifting the sensors located at the ends of two adjacent sensor chips when there.is shift between the two adjacent sensor chips.

However, referring to FIG. 5, if there is a shift distance Δy at sensors P1 and P2 at the ends of two adjacent sensor chips in the y direction, then the corresponding luminance areas of the signal waves Vp1 and Vp2 of the sensors P1 and P2 at the ends of two adjacent sensor chips 12 and 14 obtained upon scanning are not overlapped, but are spaced at a distance, because horizontal black lines 32 and 34 and the white line 38 between them are passed sequentially.

Refer to FIG. 6, a diagram illustrating the signal waves Vp1 and Vp2 of the corresponding sensors P1 and P2. Since the distance of the gap is the shift distance Δy of the sensors P1 and P2 in the vertical direction y, one way to calculate the gap Δy of the sensors P1 and P2 between the ends of the two adjacent sensor chips 12 and 14 is to horizontally shift the signal wave Vp1 corresponding to the sensor P1 to the signal wave Vp2 corresponding to. P2, or horizontally shift the signal wave Vp2 corresponding to the sensor P2 to the signal wave Vp1 corresponding to P1 until the two overlap, and calculate the shift distance to obtain its vertical gap Δy. Likewise, if the test chart is rotated at 90 degrees, the scan direction is then changed to the horizontal direction x, and the horizontal gap Δx can be obtained by performing measurement accordance with the aforementioned embodiment.

Another embodiment of the method of measuring image sensor chip shift of this invention is specified in the following.

Figure 7:
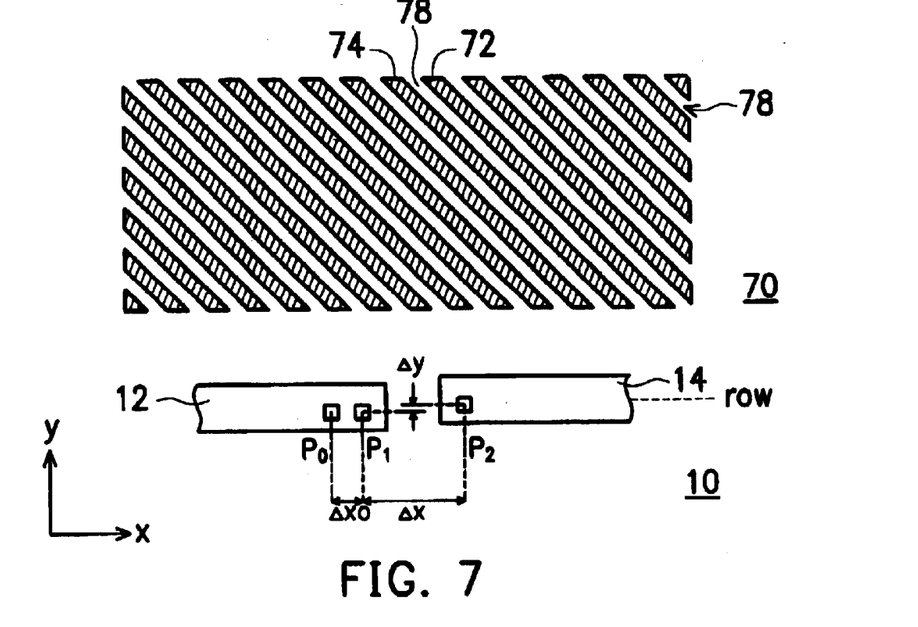
FIG. 7 is a diagram representing another embodiment of this invention, wherein the contact image sensor module scans across the diagonal or slanted lines of the test chart.

Refer to FIG. 7, a diagram illustrating an example of the contact image sensor module 20 scanning the test chart 70 along a direction y, whereby the adjacent sensor P0, P1 at the end of the sensor chip 12 and the sensor P2 at the end of the sensor chip 14 sense the test chart 70 having the predetermined pattern, such as the slanted black lines 72 and 74 and the white lines 78 between them. An angle, say 45 degrees, is formed between the row and the spaced slanted lines. The signal waves Vp0' and Vp1' corresponding to the adjacent sensor P0, P1 at the end of the sensor chip 12 and the signal wave Vp2' corresponding to the sensor P2 at the end of the sensor chip 14 are obtained by the control system 40, wherein the abscissa represents the distance in the y direction and the ordinate represents luminance variations Vout (as shown in FIG. 9A and 9B).

Furthermore, the black lines 74 and 76 and the white lines 78 of the test chart 70 can be formed with laser composite interference lines. Moreover, the scan can be performed with the main board 10 of the contact image sensor module 20 scanning the test chart in a default direction. For example, he slanted black lines can be scanned in the vertical direction y, or tie horizontal black lines can be scanned in the direction y at an angle θ, such as 45 degrees. Therefore, when the black lines, such as 72 and 74, are scanned, their corresponding signal waves indicate a low-luminance area. When the white line 78 is scanned, its corresponding signal wave is in a high-luminance area. And when the area covering part of the black lines 72 and 74 and the white line 78 is scanned, the luminance of their corresponding signal waves falls in the middle of that of the high-luminance area and the low-luminance area.

Figure 8:
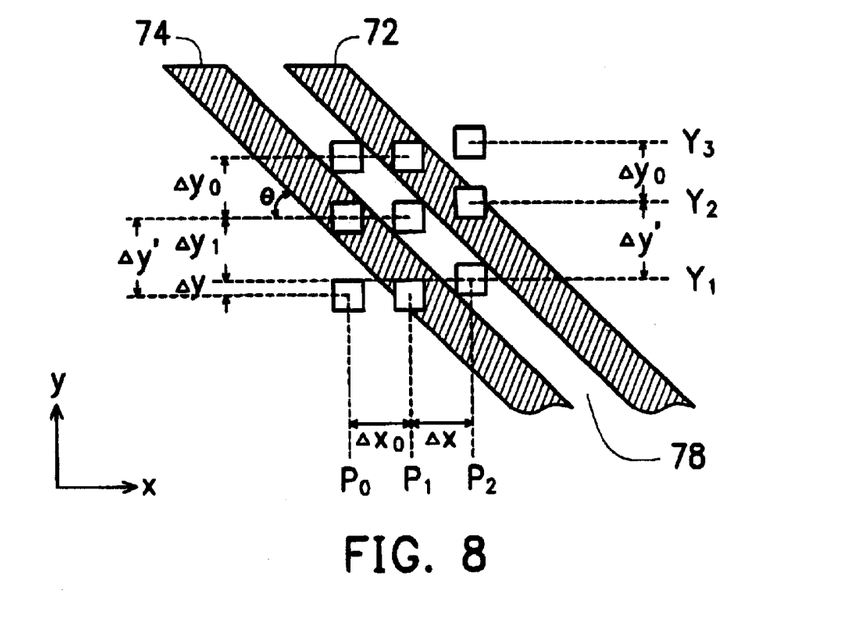
FIG. 8 illustrates the relative locations of various sensors to the diagonal lined test chart in accordance with the embodiment of FIG. 7.
Figure 9A:
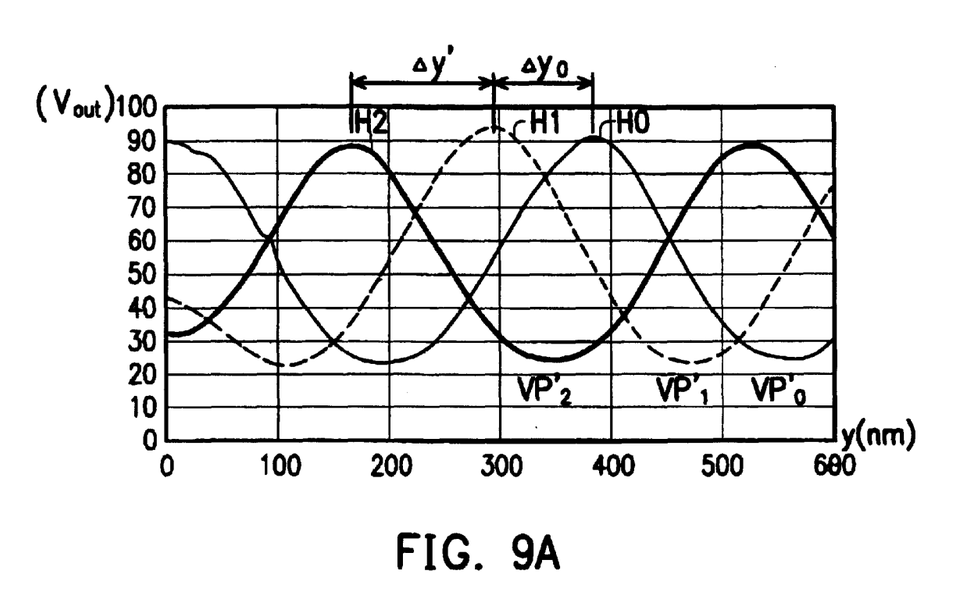
FIG. 9A is a diagram illustrating the acquisition of signal waves sensed by each sensor at the relative locations of FIG. 8.
Figure 9B:
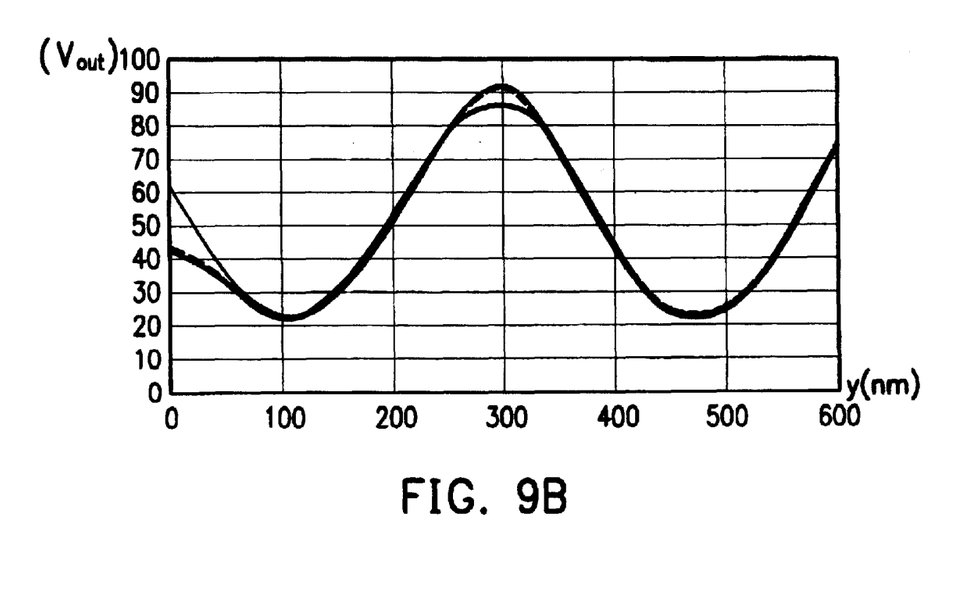
FIG. 9B is a diagram illustrating the horizontal or parallel movement of signal waves corresponding to the sensor until they overlap in accordance with FIG. 9A.

Refer to FIGS. 8, 9A and 9B, wherein diagrams illustrate the relative locations of the black lines 72 and 74 and the white line 78 to the sensors P0, P1, and P2, and the signal waves Vp0', Vp1', and Vp2' formed corresponding to the'sensors P0, P1, and P2. Therein, if the sensors P1 and P2 at the ends of the two adjacent sensor chips 12 and 14 demonstrate a vertical gap Δy in the vertical direction y and a horizontal gap Δx in the horizontal direction x (as shown in FIG. 7), then the signal waves Vp0', Vp1', and Vp2' of the sensors at the ends of sensor chips do not overlap, because the black lines 72 and 74 and the white line 78 between them are scanned in a different sequential order. Take the white line 78 for example, the sensor P2 is the first to scan the white line 78, next followed by the sensor P1, and then by the sensor P0. Consequently, the signal waves Vp0', Vp1', and Vp2' do not overlap in terms of the luminance variation Vout.

Moreover, in FIG. 8, wherein three relative locations Y1, Y2, and Y3 are specified, the horizontal gaps between the sensors P0–P1 and P1–P2 are Δx0 and Δx, respectively. Besides, the line connecting the central points of the sensors P1 and P2 in the image sensor chip module is defined in the direct on of X axis, a default angle θ is formed between the slant line of the test chart 70 and she X axis. Next, when the sensors P2, P1, and P0 reach the white line 78 sequentially, the perpendicular distance between the first location Y1 and the second location Y2 is defined as Δy', the perpendicular distance between the second location Y2 and the third location Y3 as Δy0, and the perpendicular distance between the central point of the sensor P2 of the sensor chip 14 of the first location Y1 and the central point of the sensor P1 of the sensor chip 12 of the second location.Y2 as Δy1. Hence, the following equation can be obtained:

$$\Delta y0/\Delta x0 = \tan\theta = \Delta y1/\Delta x \quad (1)$$

$$\Delta y' = \Delta y1 + \Delta y \quad (2)$$

Therefore, if the angle is 45 degrees, equation (1) can be changed into:

$$\Delta y0/\Delta x0 = 1 = \Delta y1/\Delta x \quad (3)$$

Back to FIG. 9A, in terms of the white line 78 between the slant black lines 72 and 74, high-luminance areas H2, H1, and H0 are formed when the white line 78 is first scanned by the sensor P2, followed next by the sensor P1 and further by the sensor P0. Therefore, the signal waves Vp0', Vp1', and Vp2' of the sensors P0, P1, and P2 are obtained, wherein the gap between the signal waves Vp0' and Vp1' is Δy0, and the gap between the signal waves,Vp1' and Vp2' isΔy'.

Refer to FIG. 9B, the distance of the horizontal shift can be calculated if the signal wave Vp0' is shifted horizontally to overlap with the signal wave Vp1' to further obtain their gapΔy0. Similarly, the distance of the horizontal shift can be calculated if the signal wave Vp1' is shifted horizontally to overlap with the signal wave V2'p to further obtain their gap Δy'.

Therefore, when the angle is at 45 degrees, the following is obtained in accordance with equation (3):

$$\Delta x0 = \Delta y0, \Delta x = \Delta y1 \quad (4)$$

The following can be obtained further with equation (2) in combination with equation (4):

$$\Delta x = \Delta y' - \Delta y \quad (5)$$

Since the vertical gap Δy can be obtained with the above embodiment of FIG. 6, the horizontal gap value Δx can be obtained with equation (5). Consequently, the shift values A x and Δy can be obtained with the compact image sensor scanning the two pairs of horizontal and slant black and white lines in the direction of the y axis.

In other words, the method of measuring image sensor chip shift of this embodiment can be summarized in the following steps:

First, as shown in FIGS. 1, 5, and 6, provide a contact image sensor module 20, comprising a plurality of sensor chips 12, 14, and 16 arranged in a row, each sensor chip being equipped with multiple sensors such as P1 and P2. Next, provide a first test chart 30 containing horizontally spaced black and white lines 32, 38 and 34. Further, enable the contact image sensor module 20 to scan the first test chart 30 in a direction y which is perpendicular to the row and the black and white lines 32, 38 and 34; obtain signal waves Vp1 and Vp2 of the sensors P1 and P2 at ends of the two adjacent sensor chips 12 and 14; and calculate the perpendicular gap Δy between the two ends of the adjacent sensor chips in accordance with the signal waves Vp1 and Vp2.

Next, as shown in FIGS. 7 through 9, provide a second test chart 70 containing spaced slanted black and white lines 72, 74, and 78; enable the contact image sensor module 20 to scan the second test chart 70 in a direction y, forming an angle θ, say 45 degrees, that is formed between the row and the slanted lines 72 and 74; obtain the signal waves Vp0', Vp1', and Vp2' from at least three sensors P0, P1, and P2, wherein the two sensors P1 and P2 are at the ends of the two adjacent sensor chips such as 12 and 14; and calculate the horizontal gap Δx of the sensors P1 and 22 at the ends of the two adjacent sensor chips based upon the vertical gap Δy and the shift distance of the signal waves Vp0', Vp1', and Vp2' of at least three sensors P0, P1, and P2, and the angle θ.

The gap values Δx and Δy obtained in accordance with the embodiment of this invention are the horizontal and vertical shift values, and can therefore replace the intrusive and destructive method of conventional measurement and the quality of scanned image can further be improved by compensating the horizontal and vertical shift values with utility software.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for measuring contact image sensor chip shift comprising:

a test chart having a predetermined pattern;

a contact image sensor module with a plurality of sensor chips arranged in a row, each of the sensor chip being equipped with multiple sensors disposed at the ends of at least two adjacent sensor chips;

a driving device; and a control system for controlling the driving device to move the contact image sensor module to scan the test chart, obtaining signal waves sensed by the sensors at the ends of the at least two adjacent sensor chips, and calculating a gap between the ends of the at least two adjacent sensor chips.

2. The system of claim 1, wherein the predetermined pattern has a plurality of spaced black and white lines that are parallel to the row.

3. The system of claim 2, wherein the gap at the ends of the at least two adjacent sensor chips is perpendicular to the row.

4. The system of claim 1, wherein the predetermined pattern has a plurality of spaced black and white lines that are perpendicular to the row.

5. The system of claim 4, wherein the gap at the ends of the at least two adjacent sensor chips is parallel to the row.

6. A system for measuring contact image sensor chip shift comprising:

a test chart having a predetermined pattern;

a contact image sensor module with a plurality of sensor chips arranged in a row, each of the sensor chip being equipped with multiple sensors disposed at the ends of at least two adjacent sensor chips;

a driving device; and a control system for controlling the driving device to move the test chart to be scanned by he contact image sensor module, obtaining signal waves sensed by the sensors at the ends of the at least two adjacent sensor chips, and calculating a gap between the ends of the at least two adjacent sensor chips.

7. The system of claim 6, wherein the predetermined pattern has a plurality of spaced black and white lines that are parallel to the row.

8. The system of claim 7, wherein the gap at the ends of the at least two adjacent sensor chips is perpendicular to the row.

9. The system of claim 6, wherein the predetermined pattern has a plurality of spaced black and white lanes that are perpendicular to the row.

10. The system of claim 9, wherein the gap at the ends of the at least two adjacent sensor chips is parallel to the row.

11. A method of measuring image sensor chip shift comprising the following steps:

providing a contact image sensor comprising a plurality of sensor chips arranged in a row, each sensor chip having multiple sensors;

providing a test chart with a predetermined pattern;

enabling the contact image sensor module to scan the predetermined pattern of the test chart;

obtaining signal waves sensed by the sensors at the ends of two adjacent sensor chips; and calculating a gap between the sensors at the ends of the two adjacent sensor chips according to the signal waves.

12. The method of claim 11, wherein upon scanning, the contact image sensor module is moved across the test chart.

13. The method of claim 11, wherein upon scanning, the test chart is moved across the contact image sensor module.

14. The method of claim 11, wherein the predetermined pattern of the test chart is spaced black and white lines.

15. The method of claim 14, wherein, when the sensors scan the black lines, the corresponding signal waves indicate a low-luminance area; when the sensors scan the white lines, the corresponding signal waves indicate a high-luminance area; and when the sensors scan the area composed partially of the black lines and the white lines, the luminance of the corresponding signal waves falls in the middle of that of a low-luminance area and a high-luminance area.

16. The method of claim 15, wherein the calculation of the gap of the sensors at the ends of the two sensor chips is to horizontally shift the signal waves sensed by the sensors at the ends of the two adjacent sensor chips until they overlap, and the gap of the sensors at the ends of the two adjacent sensors can be obtained by calculating a horizontally shift distance of the signal waves.

17. The method of claim 14, wherein an angle is formed by the row of the contact image sensor chips and the predetermined pattern of the test chart.

18. The method of claim 17, wherein the angle is approximately 45-degrees.

19. A method of measuring image sensor chip shift comprising the following steps:

providing a contact image sensor comprising a plurality of sensor chips arranged in a row, each sensor chip having multiple sensors;

providing a first test chart containing spaced lines parallel to the row;

enabling the contact image sensor module to scan spaced lines of the first test chart;

obtaining first signal waves sensed by the sensors at the ends of two adjacent sensor chips; and calculating a first gap between the sensors at the ends of the two adjacent sensor chips according to the first signal waves, wherein the first gap is perpendicular to the row;

providing a second test chart containing spaced slanted lines;

enabling the contact image sensor module to scan the spaced slanted lines of the second test chart, wherein an angle is formed between the spaced slanted lines and the row;

obtaining second signal waves sensed by three sensors, wherein the two of the three sensors are at the ends of the two adjacent sensor chips; and calculating a second gap between the two sensors at the ends of the two adjacent sensor chips according to the first gap, second signal waves of the three sensors, and the angle.

20. The method of claim 19, wherein the angle is approximately 45 degrees.

21. The method of claim 19, wherein the first test chart and the second test chart are light composite test charts.

22. The method of claim 21, wherein the first test chart and the second test chart are composed of interference lines caused by laser light.

* * * * *